United States Patent
Johri et al.

(10) Patent No.: US 12,328,498 B2
(45) Date of Patent: Jun. 10, 2025

(54) METHOD AND SYSTEM FOR CONTEXT-AWARE CROP IN CAMERA PREVIEW

(71) Applicant: SAMSUNG ELECTRONICS CO., LTD., Suwon-si (KR)

(72) Inventors: Jyoti Johri, Bengaluru (IN); Mayukh Das, Bengaluru (IN); Pradeep Nelahonne Shivamurthappa, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 18/211,821

(22) Filed: Jun. 20, 2023

(65) Prior Publication Data
US 2023/0412912 A1 Dec. 21, 2023

Related U.S. Application Data

(63) Continuation of application No. PCT/KR2023/002501, filed on Feb. 22, 2023.

(30) Foreign Application Priority Data

Jun. 20, 2022 (IN) .............................. 202241035329

(51) Int. Cl.
| | | |
|---|---|---|
| *H04N 23/63* | (2023.01) | |
| *H04N 5/262* | (2006.01) | |
| *H04N 23/617* | (2023.01) | |

(52) U.S. Cl.
CPC ......... *H04N 23/632* (2023.01); *H04N 5/2628* (2013.01); *H04N 23/617* (2023.01); *H04N 23/635* (2023.01)

(58) Field of Classification Search
None
See application file for complete search history.

(56) References Cited

U.S. PATENT DOCUMENTS

| | | |
|---|---|---|
| 9,344,644 B2 | 5/2016 | Ha et al. |
| 9,633,046 B2 | 4/2017 | Shah et al. |

(Continued)

FOREIGN PATENT DOCUMENTS

| | | |
|---|---|---|
| KR | 10-2015-0012887 A | 2/2015 |
| KR | 10-2016-0032170 A | 3/2016 |

(Continued)

OTHER PUBLICATIONS

Huawei, "ML Kit Upgrades Cut Cut's Image Segmentation Function: Faster and Precise Image Cutouts", retrieved on May 6, 2021, 3 pages url: https://developer.huawei.com/consumer/en/doc/development/HMSCore-Guides/ml-case-cutcut-0000001050048049.

(Continued)

*Primary Examiner* — Paul M Berardesca
(74) *Attorney, Agent, or Firm* — Sughrue Mion, PLLC

(57) ABSTRACT

A method performed by an object cropping system of an electronic device, including: receiving, from a camera, a preview image including a plurality of objects; determining outline boundaries of the plurality of objects; determining a relevance score between the plurality of objects based on context of the plurality of objects and relationship between the plurality of objects; generating a plurality of boundary suggestions including the plurality of objects, based on the relevance score; receiving a user input indicating a selection of one of the plurality of boundary suggestions or a selection of at least one object from the plurality of objects present in the plurality of boundary suggestions, wherein the relevance score is updated for the at least one object based on the user input; and cropping the at least one object from the preview (Continued)

image based on the user input and the updated relevance score using the outline boundaries determined for the plurality of objects.

15 Claims, 16 Drawing Sheets

(56) References Cited

U.S. PATENT DOCUMENTS

| | | | |
|---|---|---|---|
| 10,440,276 B2 | 10/2019 | Gupta et al. | |
| 2010/0040285 A1 | 2/2010 | Csurka et al. | |
| 2013/0101210 A1 | 4/2013 | Tang | |
| 2014/0078152 A1 | 3/2014 | Chang et al. | |
| 2014/0232906 A1 | 8/2014 | Ha et al. | |
| 2015/0278986 A1 | 10/2015 | Edwin et al. | |
| 2019/0109981 A1 | 4/2019 | Zhang et al. | |
| 2022/0269895 A1* | 8/2022 | Barkan | G06F 18/2113 |
| 2023/0353701 A1* | 11/2023 | Shukla | H04N 23/617 |
| 2024/0171848 A1* | 5/2024 | Figueroa | G06V 10/764 |

FOREIGN PATENT DOCUMENTS

| | | |
|---|---|---|
| KR | 10-2018887 B1 | 9/2019 |
| KR | 10-2063595 B1 | 1/2020 |

OTHER PUBLICATIONS

International Search Report (PCT/ISA/210) and Written Opinion (PCT/ISA/237) issued by the International Searching Authority on May 31, 2023 in International Patent Application No. PCT/KR2023/002501.

Communication dated Mar. 12, 2025 issued by the European Patent Office in European Patent Application No. 23827318.9.

Communication dated Mar. 24, 2025 issued by the Intellectual Property India in Indian Patent Application No. 202241035329.

Yan Jianzhou et al., "Learning the Change for Automatic Image Cropping", 2017 IEEE Conference on Computer Vision and Pattern Recognition (CVPR), IEEE Computer Society, US, Jun. 23, 2013, XP032492828, ISSN: 1063-6919, DOI:10.1109/CVPR.2013.130, pp. 971-978 (8 pages total).

Xiaojun Chang et al., "Scene Graphs: A Survey of Generations and Applications", arxiv.org, Cornell University Library, 201 Olin Library Cornell University Ithaca, NY 14853, Mar. 17, 2021, XP081920868, arXiv:2104.01111v1 [cs.CV] Mar. 17, 2021, pp. 1-21 (21 pages total).

Li Debang et al., "Composing Good Shots by Exploiting Mutual Relations", 2020 IEEE/CVF Conference on Computer Vision and Pattern Recognition (CVPR), IEEE, Jun. 13, 2020, XP033803612, DOI:10.1109/CVPR42600.2020.00427, pp. 4213-4222 (10 pages total).

* cited by examiner

METHOD AND SYSTEM FOR CONTEXT-AWARE CROP IN CAMERA PREVIEW

CROSS-REFERENCE TO RELATED APPLICATIONS

This application is a bypass continuation application of International Application No. PCT/KR2023/002501, filed on Feb. 22, 2023, which is based on and claims priority to Indian Patent Application No. 202241035329, filed on Jun. 20, 2022, in the Indian Patent Office, the disclosures of which are incorporated by reference herein in their entireties.

BACKGROUND

1. Field

The disclosure relates generally to image processing using Artificial Intelligence (AI) techniques, and more particularly, but not exclusively, to a method and system for context-aware crop in a camera preview.

2. Description of Related Art

Generally, the crop boundaries that appear in a capture preview may be rectangular and can only be adjusted in a rectangular fashion. In many scenarios, a user may prefer non-regular and non-polygonal boundaries for some objects present in a scene. In one embodiment, a food blogger may want a triangular/oval/circular boundary for cropping a pizza slice, a food plate and the like. Such non-regular and non-polygonal crop boundaries may exist in some arbitrary third-party applications and such third-party applications would be helpful only after the image has been captured.

For instance, in Adobe® scan application, there is an option to crop with non-rectangular boundaries. However, merely cropping a non-rectangular boundary that too after the image is captured may not suffice for professional and recreational purposes. Moreover, such third-party applications require manual input for understanding the region to be cropped, which is yet another limitation. Majority of times, users wish to view different options based on various aspects of the scene captured in the image, that allows users to choose the most suitable option for cropping.

However, the third-party applications do not provide such options rather, they completely rely on manual input to crop the image post an image capture. Currently, there are no existing techniques that allows boundary detection and cropping at a preview stage of imaging. This reduces the flexibility for the users in dynamically deciding on boundaries of an image at the time of capturing.

The information disclosed in this background of the disclosure section is only for enhancement of understanding of the general background of the disclosure and should not be taken as an acknowledgment or any form of suggestion that this information forms the prior art already known to a person skilled in the art.

SUMMARY

According to aspect of the disclosure, a method performed by an object cropping system of an electronic device, including: receiving, from a camera, a preview image including a plurality of objects; determining outline boundaries of the plurality of objects; determining a relevance score between the plurality of objects based on context of the plurality of objects and relationship between the plurality of objects; generating a plurality of boundary suggestions including the plurality of objects, based on the relevance score; receiving a user input indicating a selection of one of the plurality of boundary suggestions or a selection of at least one object from the plurality of objects present in the plurality of boundary suggestions, wherein the relevance score is updated for the at least one object based on the user input; and cropping the at least one object from the preview image based on the user input and the updated relevance score using the outline boundaries determined for the plurality of objects.

The outline boundaries of the plurality of objects may be determined by using at least one first type Artificial Intelligence (AI) based model.

The at least one first type AI based model may include enhanced Region Proposal Network (RPN) for outline boundary determination, and the enhanced RPN is integrated with an instance segmentation Deep Neural Network (DNN).

The plurality of objects may have at least one of a polygonal and a non-polygonal shape.

The relevance score between the plurality of objects based on context of the plurality of objects and relationship between the plurality of objects may be determined by using at least one second type AI based model.

The outline boundaries determined for the plurality of objects may be visualized by using borders drawn by a border-line construction model associated with the object cropping system.

The at least one second type AI based model may include a Neuro-symbolic model for determining the context of the plurality of objects and the relationship between the plurality of objects.

The relationship between the plurality of objects is determined based on scene description and the context of the plurality of objects.

The method may further include pre-processing the preview image to eliminate at least one of redundant image frames and irrelevant image frames.

The method may further include storing the cropped at least one object in a single image or in multiple images.

The method may further include, based on the preview image including a single object having one of a polygonal and a non-polygonal shape: determining an outline boundary of the single object using the at least one first type AI based model; generating at least one boundary suggestion including the single object; receiving the user input indicating a selection of one of the at least one boundary suggestion; and cropping the single object from the preview image based on the user input using the outline boundary determined for the single object.

According to an aspect of the disclosure, an electronic device includes: a memory storing instructions; and a processor configured to execute the instructions to: receive a preview image including a plurality of objects; determine outline boundaries of the plurality of objects; determine a relevance score between the plurality of objects based on context of the plurality of objects and relationship between the plurality of objects; generate a plurality of boundary suggestions including the plurality of objects, based on the relevance score; receive a user input indicating a selection of one of the plurality of boundary suggestions or a selection of at least one object from the plurality of objects present in the plurality of boundary suggestions, wherein the relevance score is updated for the at least one object based on the user input; and crop the at least one object from the preview image based on the user input and the updated relevance score using the outline boundaries determined for the plurality of objects.

The processor may be further configured to execute the instructions to determine the outline boundaries of the plurality of objects by using at least one first type Artificial Intelligence (AI) based model.

The at least one first type AI based model may include enhanced Region Proposal Network (RPN) for outline boundary determination, wherein the enhanced RPN is integrated with an instance segmentation Deep Neural Network (DNN).

The plurality of objects may have at least one of a polygonal and a non-polygonal shape.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
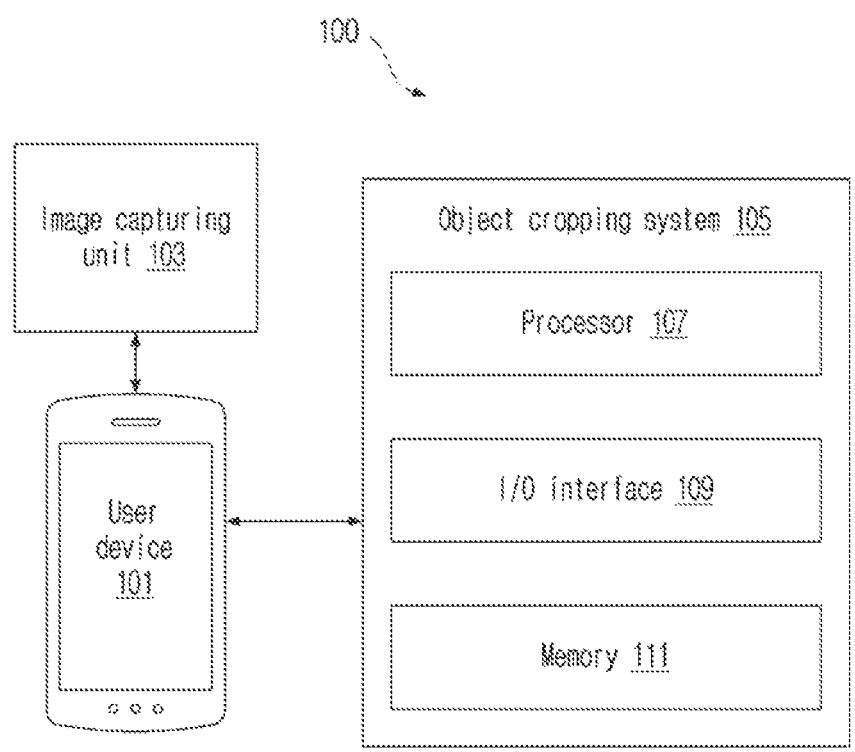
FIG. 1A illustrates an exemplary architecture for a context-aware crop in a camera preview, in accordance with some embodiments of the present disclosure.

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

Those skilled in the art may understand that any block diagrams herein represent conceptual views of illustrative systems embodying the principles of the present disclosure. Similarly, those skilled in the art may understand that any flow charts, flow diagrams, state transition diagrams, pseudo code, and the like represent various processes which may be substantially represented in computer readable medium and executed by a computer or processor, whether or not such computer or processor is explicitly shown.

Disclosed herein is a method and system for context-aware crop in a camera preview. The present disclosure provides a context-aware mechanism, i.e., a holistic reasoning over more than one object/entity and relationships among them in a single scene of a preview image or across preview images/frames, to identify one or more probably most interesting objects in the image based on scene context or inter-frame context, that is efficient to be executed on the preview frames.

The present disclosure also provides a multi-crop boundary suggestion, via an artificial intelligence (AI) framework that will leverage Neuro-symbolic reasoning and Region Proposal models together. Further, the present disclosure suggests crop boundaries that may be non-regular, non-polygonal, fitted to object/regions or set of objects/regions (overlapping or non-overlapping). The suggested crop boundaries are provided at the preview stage such that user can understand how to best point camera or choose focus to achieve optimal cropping.

The present disclosure also provides the feature of "early exits" that allows the object cropping system to eliminate irrelevant regions, blank spaces and irrelevant frames at the preview stage itself, which reduces the computations on the irrelevant frames.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A illustrates an exemplary architecture for a context-aware crop in a camera preview, in accordance with some embodiments of the present disclosure.

The architecture 100 includes a user device 101 (e.g., an electronic device), an image capturing unit 103 and an object cropping system 105. In some embodiments, the image capturing unit 103 and an object cropping system 105 may be configured in the user device 101. In some other embodiments, the image capturing unit 103 and the object cropping system 105 may be communicatively connected to the user device 101 via a communication network. The communication network may be one of a wired communication network, wireless communication network or a combination of both.

In one embodiment, the user device 101 may include, but not limited to, a mobile phone, a tablet phone, a laptop, a desktop and the like. In one embodiment, the image capturing unit 103 may be a camera or a camera device that is capable of communicatively interfacing with the user device 101. In the context of the present disclosure, the description is explained considering the user device 101 as a mobile phone or a tablet phone which has an integrated camera as the image capturing unit 103. However, this should not be construed as a limitation of the present disclosure since the user device 101 and the image capturing unit 103 may be associated in any manner as described above in this paragraph.

The object cropping system 105 may include a processor 107, an input/output (I/O) interface 109 and a memory 111. The I/O interface 109 may receive a preview image during a preview stage from the image capturing unit 103. In some embodiments, the preview image may include a plurality of objects having at least one of a polygonal and a non-polygonal shape.

In some embodiments, the non-polygonal shape objects may include objects that have non-regular shapes. In one embodiment, non-regular shapes may be any shape that does not fall under standard geometrical shapes such as circle, triangle, rectangle, trapezium, square, and the like.

Figure 1B:
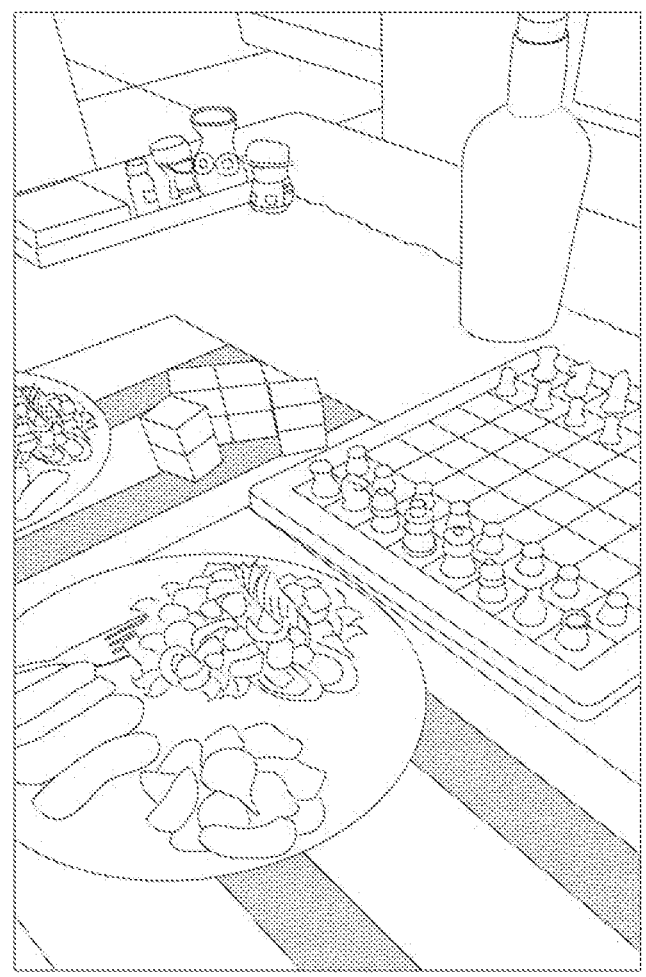
FIG. 1B shows an exemplary preview image including plurality of objects, in accordance with some embodiments of the present disclosure.

In one embodiment, consider the preview image as shown in the FIG. 1B. The plurality of objects in the preview image as shown in the FIG. 1B may be a checkerboard, a plate, food on the plate, a bottle, a salt shaker and the like. In this example, the plate in circular shape is a non-polygonal shaped object, checkerboard in the image which is in rectangular shape may be a polygonal shaped object and food on the plate such as vegetables and fries may be non-polygonal and non-regular shaped objects.

In some embodiments, upon receiving the preview image, the processor 107 may pre-process the preview image to eliminate at least one of redundant image frames and irrelevant image frames. Upon pre-processing the preview image, the processor 107 may determine outline boundaries of the plurality of objects present in the preview image using one or more first type Artificial Intelligence (AI) based models. In one embodiment, the one or more first type AI based models includes enhanced Region Proposal Network (RPN) for outline boundary determination.

In some embodiments, the enhanced RPN may be integrated with an instance segmentation Deep Neural Network (DNN). The processor 107 may visualize the outline boundaries determined for the plurality of objects using borders drawn by a border-line construction model associated with the object cropping system 105. Upon determining the boundaries, the processor 107 may determine a relevance score between the plurality of objects based on context of the plurality of objects and relationship between the plurality of objects using one or more second type AI based models. The relevance score in the context of the present disclosure may be a score that establishes or quantifies relevancy between the plurality of objects in the preview image. The relationship between the plurality of objects, one of the parameters that helps in determining the relevance score, may be determined based on scene description and the context of the plurality of objects. In some embodiments, the one or more second type of AI models may include, but not limited to, Neuro-symbolic model for determining the context of the plurality of objects and the relationship between the plurality of objects.

Further, the processor 107 may generate a plurality of boundary suggestions including the plurality of objects, based on the relevance score. A user of the user device may provide a user input indicating a selection of one of the plurality of boundary suggestions or a selection of one or more objects from the plurality of objects present in the plurality of boundary suggestions. The processor 107 may receive the user's input and thereafter, the processor 107 may update the two or more objects based on the user's input.

Subsequently, the processor 107 may crop the one or more objects from the preview image based on the user input and the updated relevance score using the outline boundaries determined for the plurality of objects. In some embodiments, the processor 107 may store the cropped one or more objects in a single image or in multiple images in the memory 111. For instance, if the one or more objects as shown in the FIG. 1B are considered for cropping, then the cropped objects such as pizza, salt shaker and the food plate could be all stored in a single image. Alternatively, cropped pizza may be stored as a separate image, cropped salt shaker may be stored as a separate image and the food plate may be stored as a separate image.

Figure 1C:
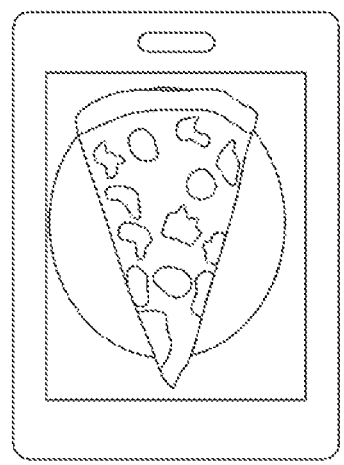
FIG. 1C shows an exemplary preview image including a single object, in accordance with some embodiments of the present disclosure.

In some embodiments, the aforementioned method of determining relationship between objects in the preview image and the relevance score in order to determine boundaries to be cropped, may be applicable when multiple objects are present in the scene captured in the preview image. However, when the preview image includes a single object having either a polygonal or a non-polygonal shape, for instance, a slice of pizza placed on a plate as shown in the FIG. 1C, the processor 107 may initially determine an outline boundary of the single object using the one or more first type AI based models.

Thereafter, the processor 107 may generate one or more boundary suggestions including the single object. For instance, the outline boundary may be generated for the slice of pizza in one of the suggestions and in another suggestion, the outline boundary may be generated for the slice of pizza and the plate on which the slice of pizza is placed.

Figure 1D:
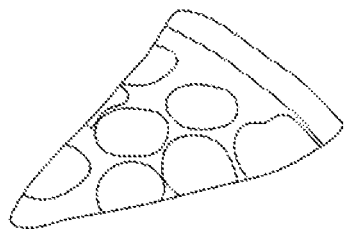
FIG. 1D shows an exemplary outline boundary of a single object (a slice of pizza), in accordance with some embodiments of the present disclosure.

Further, the processor 107 may receive a user input indicating the selection of one of the one or more boundary suggestions. Based on the user input, the processor 107 may crop the single object from the preview image using the outline boundary determined for the single object. For instance, if the user has selected the boundary suggestion including the slice of pizza, the processor 107 may crop out the outline boundary of the slice of pizza as shown in the FIG. 1D and store the image in the memory 111.

Figure 2A:
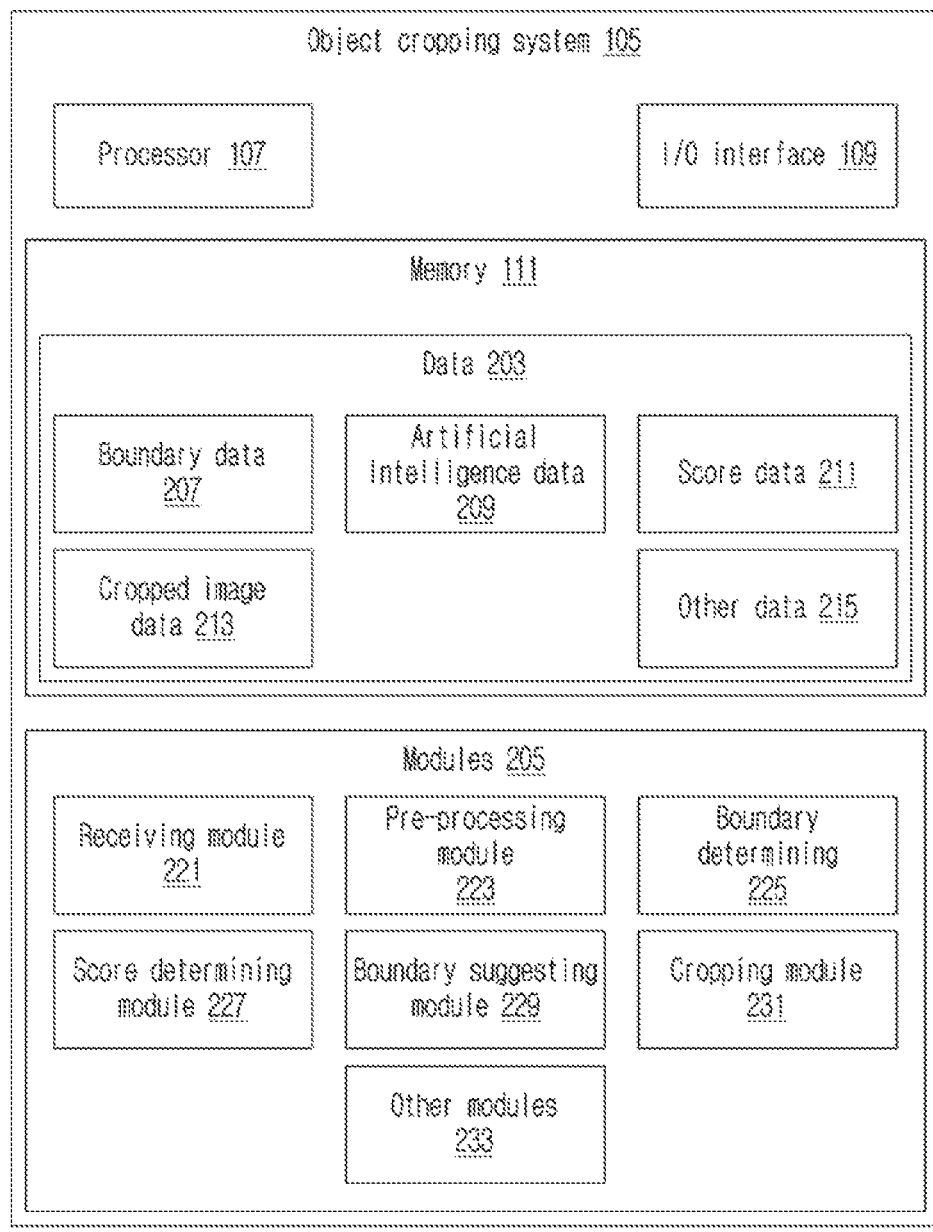
FIG. 2A shows a detailed block diagram of the object cropping system for context-aware crop in a camera preview, in accordance with some embodiments of the present disclosure.

FIG. 2A shows a detailed block diagram of the object cropping system for context-aware crop in a camera preview, in accordance with some embodiments of the present disclosure.

In some implementations, the object cropping system 105 may include data 203 and modules 205. In one embodiment, the data 203 is stored in the memory 111 configured in the object cropping system 105 as shown in the FIG. 2A. In one embodiment, the data 203 may include boundary data 207, AI models data 209, score data 211, cropped image data 213 and other data 215.

In an embodiment, the data 203 may be stored in the memory 111 in the form of various data structures. Additionally, the data 203 can be organized using data models, such as relational or hierarchical data models. The other data 215 may store data, including temporary data and temporary files, generated by the modules 205 for performing the various functions of the object cropping system 105.

In an embodiment, the data 203 stored in the memory 111 may be processed by the modules 205 of the object cropping system 105. The modules 205 may be stored within the memory 111. In an example, the modules 205 communicatively coupled to the processor 107 configured in the object cropping system 105, may also be present outside the memory 111 as shown in FIG. 2A and implemented as hardware. As used herein, the term modules refer to an application-specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 221, a pre-processing module 223, a boundary determining module 225, a score determining module 227, a boundary suggesting module 229, a cropping module 231 and other modules 233. The other modules 233 may be used to perform various miscellaneous functionalities of the object cropping system 105. Such aforementioned modules 205 may be represented as a single module or a combination of different modules.

In some embodiments, the receiving module 221 may receive a preview image during a preview stage from an image capturing unit 103 associated with the object cropping system 105. In some embodiments, the preview image may include, but not limited to, a plurality of objects having at least one of a polygonal and a non-polygonal shape. In some embodiments, the non-polygonal shape objects may include objects that have non-regular shapes.

In some embodiments, the pre-processing module 223 may pre-process the preview image to eliminate at least one of redundant image frames and irrelevant image frames. This process of pre-processing and removing the redundant and irrelevant image frames at the preview stage itself may also be referred as "Early exits" in the context of the present disclosure.

In some embodiments, in a given preview image, the pre-processing module 223 may remove regions that are not interesting, regions that are blank, regions that are out of focus and the like. This in turn reduces the processing burden and symbolic computation since the unwanted and irrelevant parts of the preview image are eliminated even before further processing occurs.

In some embodiments, the boundary determining module 225 may determine outline boundaries of the plurality of objects using one or more first type AI based models. The one or more first type AI based models may include, but not limited to, enhanced Region Proposal Network (RPN) for outline boundary determination. The enhanced RPN may be integrated with an instance segmentation Deep Neural Network (DNN).

In one embodiment, the instance segmentation DNN may be a Feature Pyramid Network (FPN). The one or more first type AI based models may be stored as the AI data 209. In some embodiments, the boundary determining module 225 may initially determine a plurality of relevant and interesting regions or in other words, objects in the preview image, based on context of the plurality of objects, using the enhanced RPN. Thereafter, the boundary determining module 225 may determine initial outline boundaries for the plurality of objects in the preview image using the instance segmentation DNN such as an FPN.

In some embodiments, the outline boundaries determined for the plurality of objects may be visualized using borders drawn by a border-line construction model associated with the object cropping system 105. The outline boundaries may be visualized in one or more colors. The initially determined outline boundaries may be stored as the boundary data 207 in the memory 111.

In some embodiments, the score determining module 227 may determine a relevance score between the plurality of objects based on context of the plurality of objects and relationship between the plurality of objects using one or more second type AI based models. In some embodiments, the one or more second type AI based models may include a Neuro-symbolic model for determining the context of the plurality of objects and the relationship between the plurality of objects.

Figure 2B:
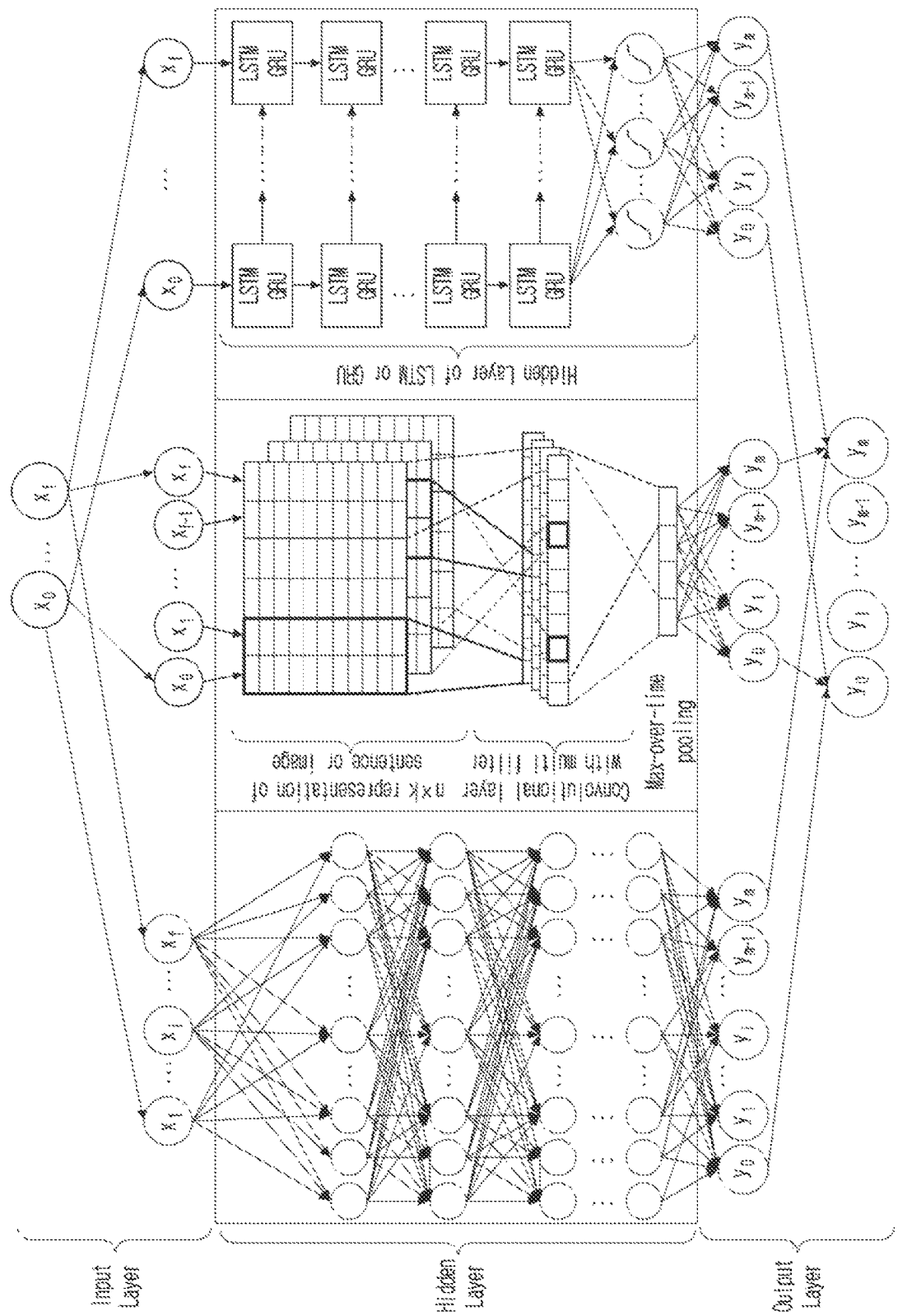
FIG. 2B shows an exemplary neuro-symbolic model, in accordance with some embodiments of the present disclosure.

In one embodiment, the Neuro-symbolic model may be a neural logic machines or logic tensor networks. An exemplary neuro-symbolic model is shown in the FIG. 2B. The exemplary neuro-symbolic model includes an input layer, a hidden layer and an output layer. The one or more second type AI based models may be stored as the AI data 209.

In some embodiments, the Neuro-symbolic model may determine the context of the plurality of objects based on information as learnt from at least one of inter and intra frames. In the present disclosure, context of the plurality of objects may be defined as a holistic reasoning over the plurality of objects and relationships among them in a single scene of the preview image or across multiple preview image frames, in order to identify higher level information beyond pixels.

The neuro-symbolic model may thus be trained to categorize the plurality of objects based on context of the plurality of objects using symbolic reasoning. Thereafter, the neuro-symbolic model may also be trained to learn the relationship between the plurality of objects that are categorized based on the context of the plurality of objects. In some embodiments, the score determining module 227 may thereafter determine a relevance score between the plurality of objects based on scene description and the context of the plurality of objects and the relationship between the plurality of objects.

In one embodiment, if the scene in the preview is that of food kept on a table, then the plurality of objects in the preview image, which is present on the table, but related to food may be determined to be related objects, and thus, a relevance score may be established between such objects determined to be related. The relevance score in the context of the present disclosure may be a score that establishes or quantifies relevancy between the plurality of objects in the preview image. The relevance score thus determined may be stored as the score data 211 in the memory 111.

In some embodiments, the boundary suggesting module 229 may generate a plurality of boundary suggestions including the plurality of objects based on the relevance score. In some embodiments, the generated boundary suggestions may be suggested to the user starting from the plurality of objects that were determined to have the highest relevance score. In other words, the generated boundary suggestions may comprise the plurality of objects that are determined to be contextually related and relevant to one another.

In some embodiments, the generated boundaries may be fitted boundaries for the non-polygonal and non-regular objects in the preview image. The boundary generation loss may include context divergence over multiple related regions and the loss will be used to train the "instance segmentation DNN" such as FPN to generate fitted boundaries.

In some embodiments, the receiving module 221 may further receive a user input indicating a selection of one of the plurality of boundary suggestions or a selection of one or more objects from the plurality of objects present in the plurality of boundary suggestions. This means that, if the plurality of boundary suggestions has successfully captured the objects that the user desires to retain and crop in the preview image, the user may select one of the plurality of boundary suggestions as the user input.

However, if the plurality of boundary suggestions has not successfully captured all the objects that the user desires to retain and crop in the preview image, the user may provide the selection of the one or more objects from the plurality of objects that need to be retained and cropped in the preview image, as the user input. In some embodiments, based on the user input, i.e., the score determining module 227 may update the relevance score for the two or more objects based on the user input.

In one embodiment, among four boundary suggestions that are provided to the user in a descending order of relevance score between the plurality of objects, the user selected the third boundary suggestion. In that case, the score determining module 227 may update the relevance score between the two or more objects present in the third boundary suggestion such that, the updated relevance score would become highest among the other relevance scores.

In another scenario, the user may select the one or more objects to be added to the already provided boundary suggestions, or to be removed from the already suggested boundary suggestions. Even in such scenarios, based on the user input, the score determining module 227 may update the relevance score between the objects that the user wishes to retain and crop in the preview image such that, the updated relevance score is highest among the other relevance scores. The update relevance scores may also be stored as the score data 211 in the memory 111.

In some embodiments, the cropping module 231 may crop the one or more objects from the preview image based on the user input and the updated relevance score using the outline boundaries determined for the plurality of objects. In some embodiments, cropping may be performed upon optimally fitting to the non-polygonal and/or non-regular cropping boundaries of the plurality of objects.

In some embodiments, the cropping module 231 may store the cropped one or more objects in a single image or in multiple images in the memory 111 as cropped image data 213. For instance, if the one or more objects as shown in the FIG. 1B are considered for cropping, then the cropped objects such as pizza, salt shaker, and the food plate could be all stored in a single image. Alternatively, cropped pizza may be stored as a separate image, cropped salt shaker may be stored as a separate image and the food plate may be stored as a separate image.

In some embodiments, the aforementioned method of determining relationship between objects in the preview image and relevance score in order to determine boundaries to be cropped may be applicable when multiple objects are present in the scene captured in the preview image. However, when the preview image includes a single object having either a polygonal or a non-polygonal shape, for instance a slice of pizza placed on a plate, the boundary determining module 225 may initially determine an outline boundary of the single object using the one or more first type AI based models. Thereafter, the boundary determining module 225 may generate one or more boundary suggestions including the single object.

Further, the receiving module 221 may receive a user input indicating the selection of one of the one or more boundary suggestions. Based on the user input, the cropping module 231 may crop the single object from the preview image using the outline boundary determined for the single object. For instance, if the user has selected the boundary suggestion including the slice of pizza, the cropping module 231 may crop out the outline boundary of the slice of pizza and store the image in the memory 111.

The operation described above is hereinafter explained with the help of an exemplary scenario. However, this should not be construed as a limitation of the present disclosure, since this is only provided for understanding purpose.

Figure 2C:
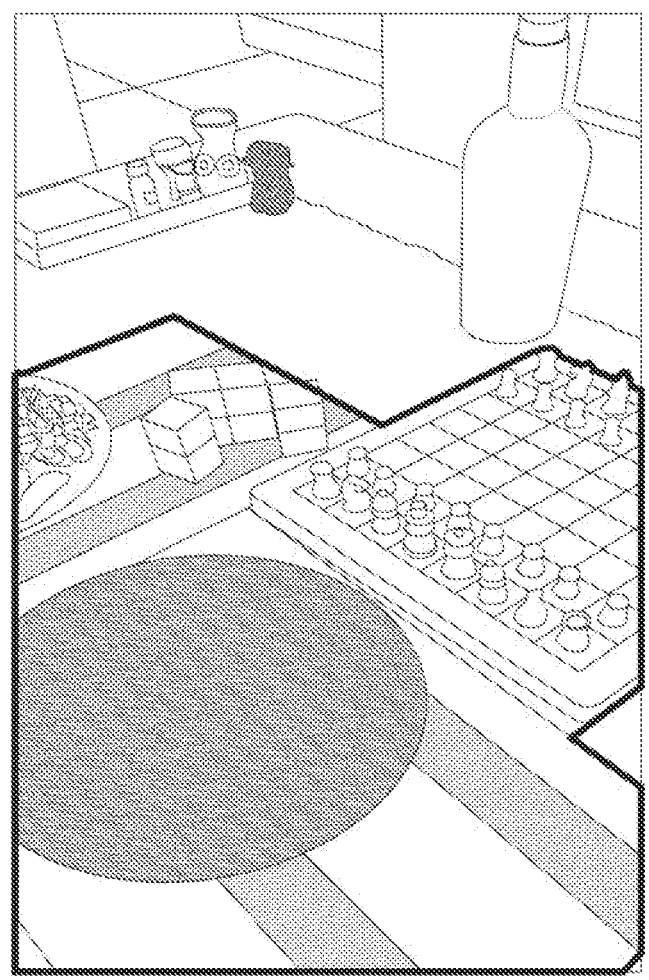
FIG. 2C shows an exemplary image where relevant and interesting regions have been marked, in accordance with some embodiments of the present disclosure.

Consider an exemplary preview image as shown in the FIG. 1B. The preview frame may be provided as an input to the one or more first AI models including an enhanced RPN model. The enhanced RPN model may determine the plurality of objects in the preview image as identified in the preview image may be a food plate, a checkerboard, a bottle, a table, a salt shaker, food (veggies and fries), and a dining mat, and to initially fit boundaries around each of the plurality of objects. Thereafter, the object cropping system 105 may use the one or more first AI models to determine the context sensitive most relevant and interesting regions to be the food plate, dining mat, and the salt shaker, as shown in the FIG. 2C.

In some embodiments, the context information and the relationship between the plurality of objects may be determined using the one or more second AI models including neuro-symbolic model. In this example, the context information (i.e., context between the plurality of objects) may be food related. The one or more second AI models may learn relationship information between the plurality of objects as shown in the FIG. 2D.

Figure 2D:
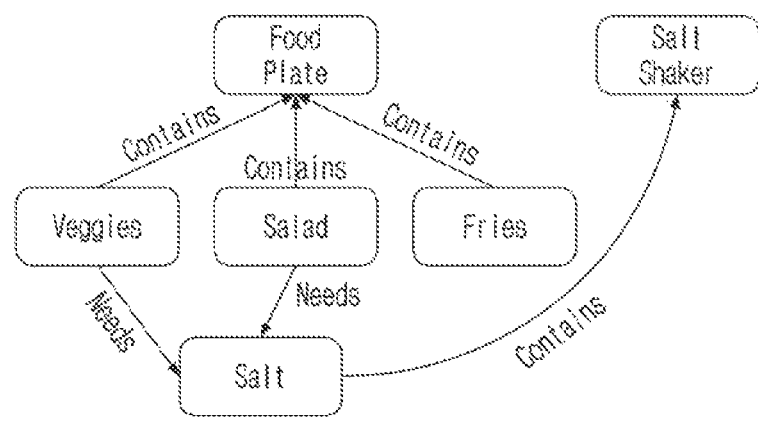
FIG. 2D shows an exemplary relationship information between the plurality of objects, in accordance with some embodiments of the present disclosure.

For instance, in the FIG. 2D, it is learned that food plate contains veggies, salad and fries. Veggies and salad need salt, and salt is contained in a salt shaker. Based on this understanding of the relationship between the plurality of objects and context of the plurality of objects, the object cropping system 105 may determine the relevance score between the plurality of objects.

Figure 2E:
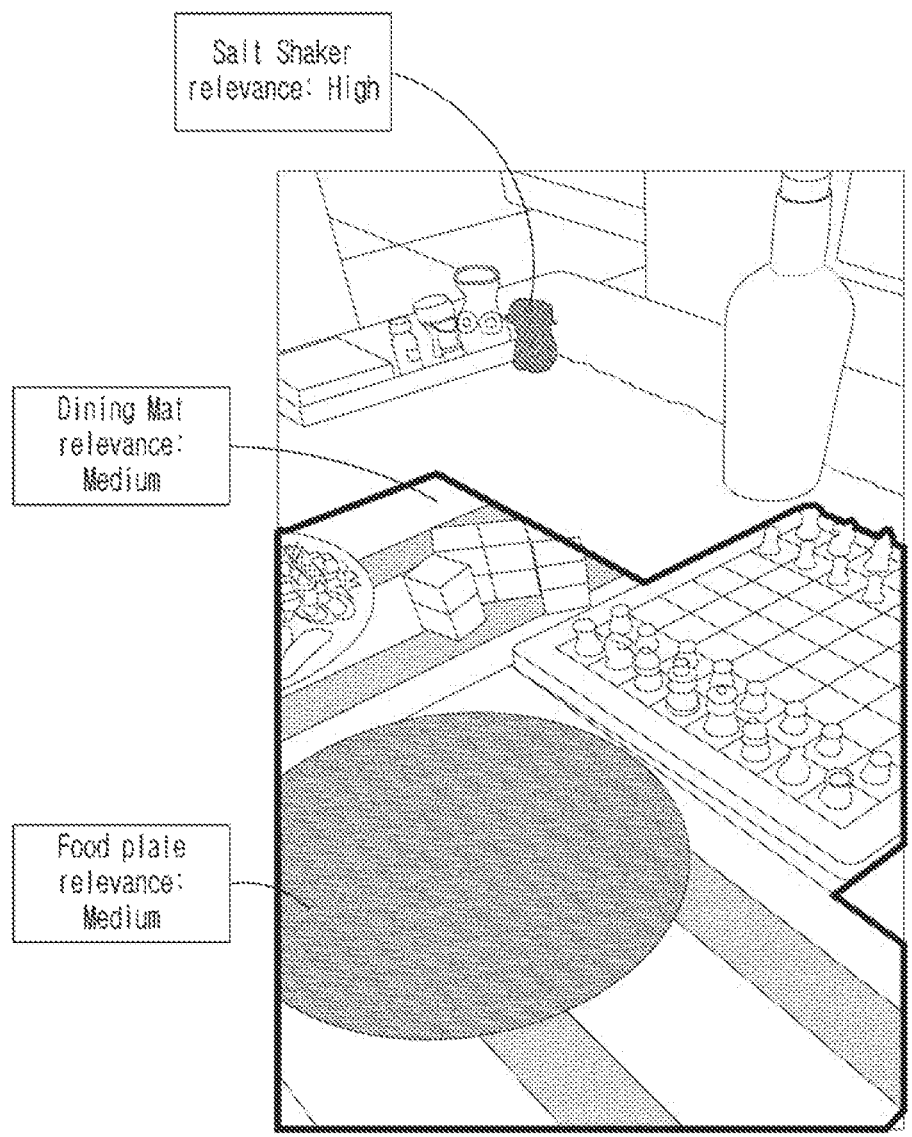
FIG. 2E shows an exemplary image including relevance scores for a plurality of objects, in accordance with some embodiments of the present disclosure.

In this case, the relevance is shown in terms of high, low and medium instead of the scores. However, this should not be construed as a limitation of the present disclosure, since the relevance can be indicated in terms of scores as well. The exemplary relevance scores indicated for the plurality of objects i.e., the food plate, salt shaker and the dining mat are as shown in the FIG. 2E.

Figure 2F:
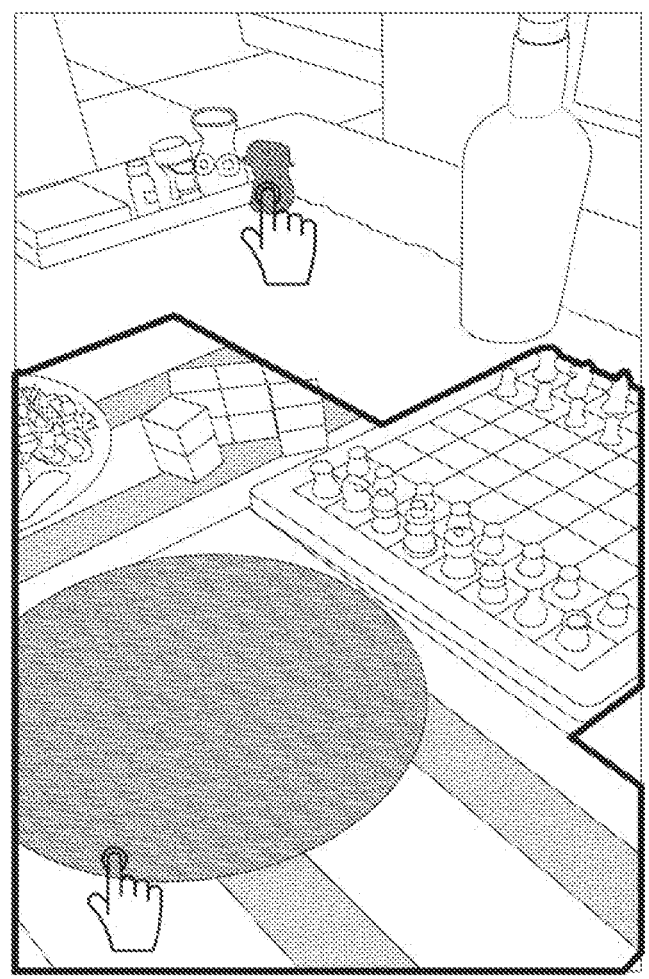
FIG. 2F shows an exemplary image indicating a user input for suggested boundaries, in accordance with some embodiments of the present disclosure.
Figure 2G:
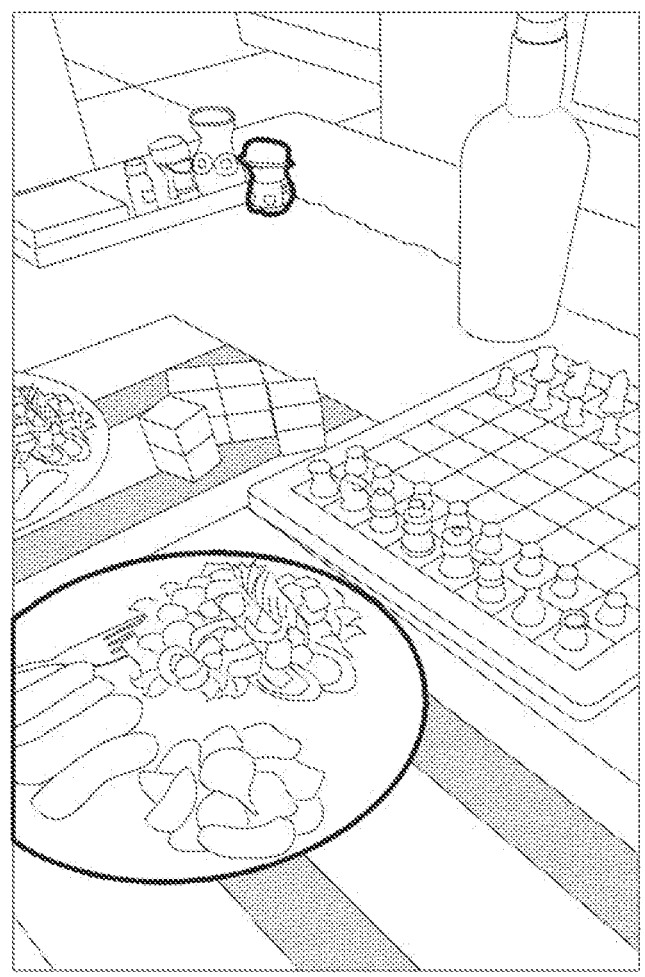
FIG. 2G shows an exemplary image indicating fitted boundaries for the user selected objects, in accordance with some embodiments of the present disclosure.
Figure 2H:
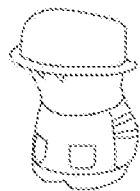
FIG. 2H and FIG. 2I show separately cropped objects from the preview image, in accordance with some embodiments of the present disclosure.
Figure 2I:
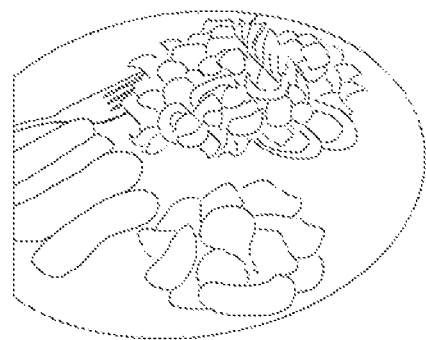

As per the relevance scores, since the food plate and the salt shaker have relevance scores as "high", and the dining mat has the relevance score as "medium", the object cropping system 105 may generate a boundary suggestion including the food plate, the salt shaker and the dining mat. However, the user may provide his or her selection in the form of a user input as shown in the FIG. 2F, i.e., the user selects only the food plate and the salt shaker. Therefore, the object cropping system 105 adjusts and fits the boundary around the selected objects i.e., the food plate and the salt shaker as shown in the FIG. 2G and crops the objects from the preview image separately as shown in the FIG. 2H and FIG. 2I.

Figure 3A:
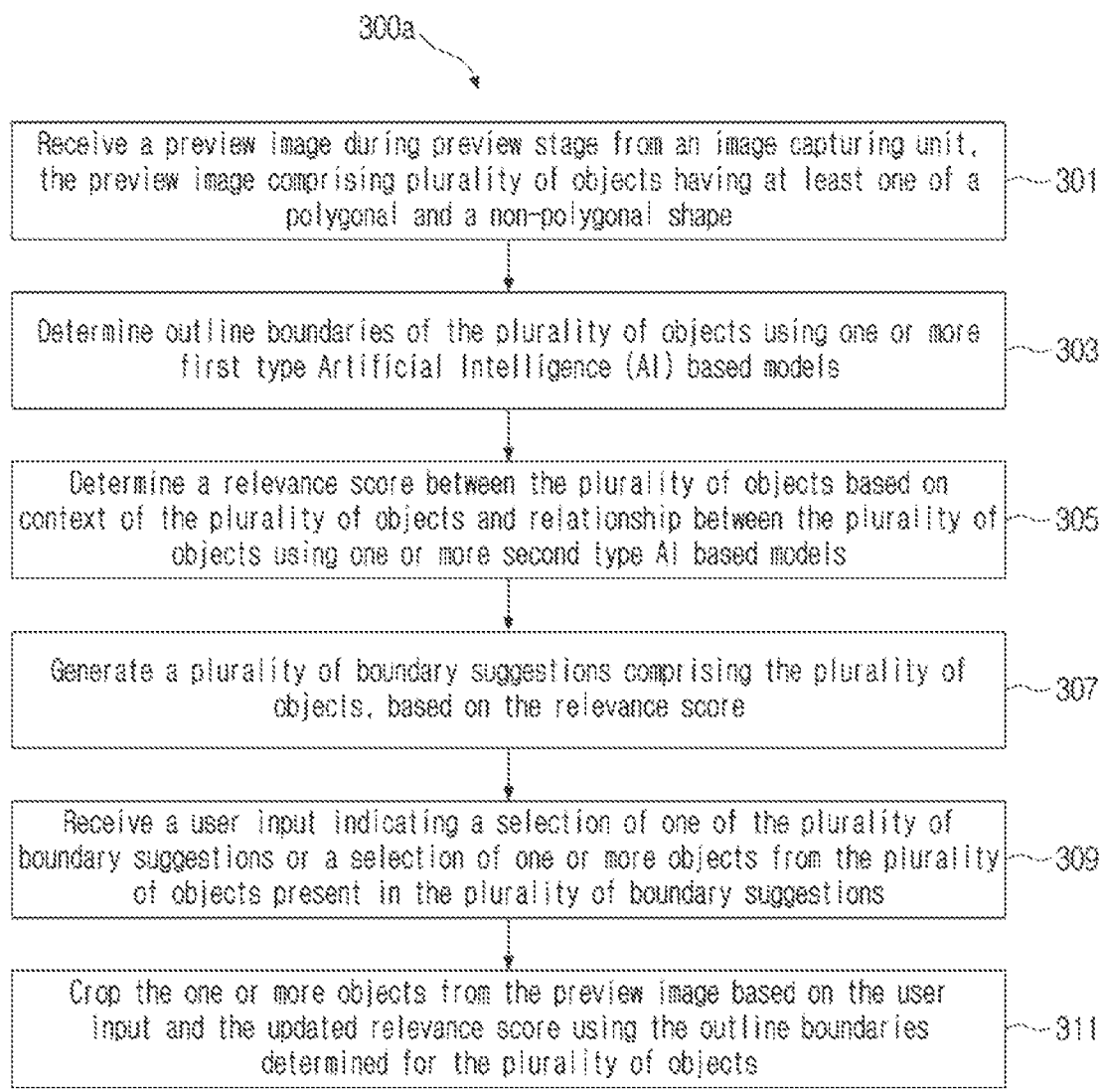
FIG. 3A shows a flowchart illustrating a method for context-aware crop in a camera preview, when there are plurality of objects in the preview image, in accordance with some embodiments of the present disclosure.

FIG. 3A shows a flowchart illustrating a method 300a for context-aware crop in a camera preview, when there are plurality of objects in the preview image, in accordance with some embodiments of the present disclosure.

As illustrated in FIG. 3A, the method 300a includes one or more operations illustrating a method for context-aware crop in a camera preview, when there are plurality of objects in the preview image. The method 300a may be described in the general context of computer-executable instructions. Generally, computer-executable instructions can include routines, programs, objects, components, data structures, procedures, modules, and functions, which perform functions or implement abstract data types.

The order in which the method 300a is described is not intended to be construed as a limitation, and any number of the described method operations can be combined in any order to implement the method 300a. Additionally, individual operations may be deleted from the methods without departing from the spirit and scope of the subject matter described herein. Furthermore, the method 300a can be implemented in any suitable hardware, software, firmware, or combination thereof.

At operation 301, the method 300a may include receiving, by a processor 107 configured in an object cropping system 105 which is in turn configured in a user device 101, a preview image including a plurality of objects from an image capturing unit 103. In some embodiments, the plurality of objects may have at least one of a polygonal and a non-polygonal shape. In some embodiments, the processor 107 may pre-process the preview image to eliminate at least one of redundant image frames and irrelevant image frames.

At operation 303, the method 300a may include determining, by the processor 107, outline boundaries of the plurality of objects using one or more first type AI based models. In some embodiments, the one or more first type AI based models includes enhanced Region Proposal Network (RPN) for outline boundary determination. The enhanced RPN is integrated with an instance segmentation Deep Neural Network (DNN).

At operation 305, the method 300a may include determining, by the processor 107, a relevance score between the plurality of objects based on context of the plurality of objects and relationship between the plurality of objects using one or more second type AI based models. In some embodiments, the relationship between the plurality of objects may be determined based on scene description and the context of the plurality of objects. In some embodiments, the one or more second type AI based models includes a Neuro-symbolic model for determining the context of the plurality of objects and the relationship between the plurality of objects.

At operation 307, the method 300a may include generating, by the processor 107, a plurality of boundary suggestions including the plurality of objects, based on the relevance score.

At operation 309, the method 300a may include receiving, by the processor 107, a user input indicating a selection of one of the plurality of boundary suggestions or a selection of one or more objects from the plurality of objects present in the plurality of boundary suggestions. In some embodiments, the relevance score is updated for the two or more objects based on the user input.

At operation 311, the method 300a may include cropping, by the processor 107, the one or more objects from the preview image based on the user input and the updated relevance score using the outline boundaries determined for the plurality of objects. In some embodiments, the cropped one or more objects may be stored in a single image or in multiple images.

Figure 3B:
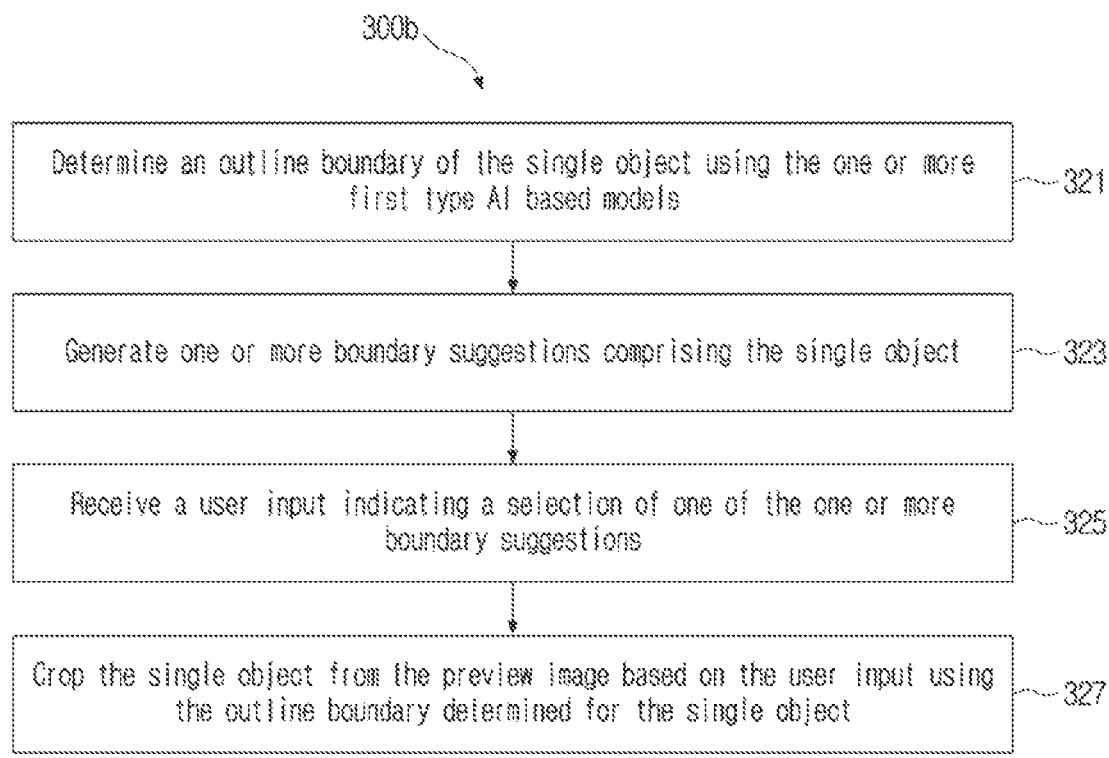
FIG. 3B shows a flowchart illustrating a method for context-aware crop in a camera preview, when there is a single object in the preview image, in accordance with some embodiments of the present disclosure.

FIG. 3B shows a flowchart illustrating a method for context-aware crop in a camera preview, when there is a single object in the preview image, in accordance with some embodiments of the present disclosure.

As illustrated in FIG. 3B, the method 300b includes one or more operations illustrating a method for context-aware crop in a camera preview, when there is a single object in the preview image. The method 300b may be described in the general context of computer-executable instructions. Generally, computer-executable instructions can include routines, programs, objects, components, data structures, procedures, modules, and functions, which perform functions or implement abstract data types.

The order in which the method 300b is described is not intended to be construed as a limitation, and any number of the described method operations can be combined in any order to implement the method 300b. Additionally, individual operations may be deleted from the methods without departing from the spirit and scope of the subject matter described herein. Furthermore, the method 300b can be implemented in any suitable hardware, software, firmware, or combination thereof.

At operation 321, the method 300b may include determining, by a processor 107 configured in an object cropping system 105 which is in turn configured in a user device 101, an outline boundary of the single object using the one or more first type AI based models. In some embodiments, the single object may be one of a polygonal and a non-polygonal shape.

At operation 323, the method 300b may include generating, by the processor 107, one or more boundary suggestions including the single object.

At operation 325, the method 300b may include receiving, by the processor 107, a user input indicating a selection of one of the one or more boundary suggestions.

At operation 327, the method 300b may include cropping, by the processor 107, the single object from the preview image based on the user input using the outline boundary determined for the single object.

Figure 4:
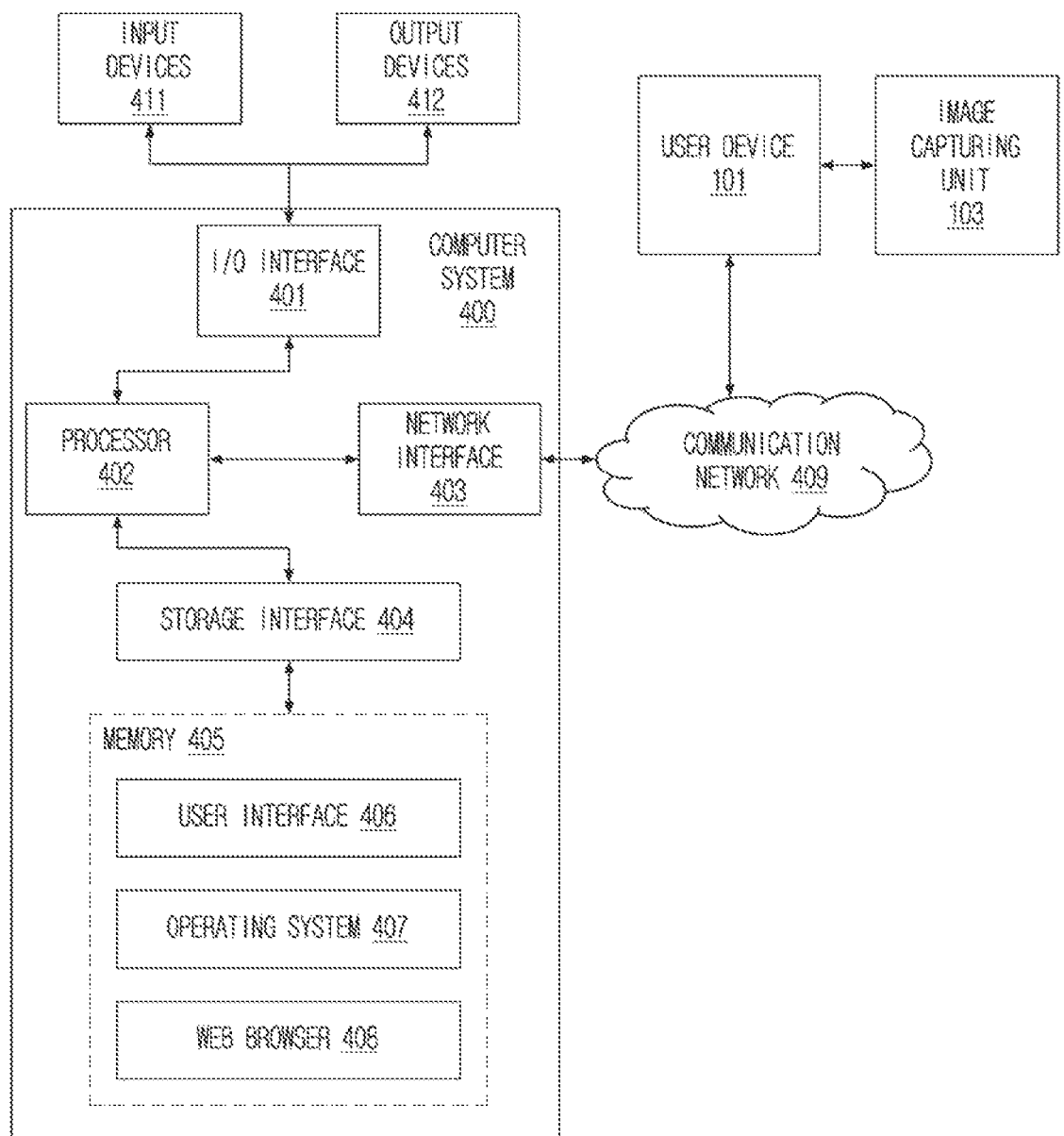
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present disclosure. In some embodiments, the computer system 400 can be an object cropping system 105 that is used for context-aware crop in a camera preview. The computer system 400 may include a central processing unit ("CPU" or "processor") 402.

The processor 402 may include at least one data processor for executing program components for executing user or system-generated business processes. A user may include a person, a person using a device such as such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a user device 101 and the user device 101 is associated communicatively with an image capturing unit 103. The user device 101 may include, but not limited to, a mobile phone, a laptop, a tablet phone, a desktop and the like.

The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc.) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, JavaScript®, AJAX, HTML, Adobe® Flash®, etc.), or the like.

The computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure HYPERTEXT Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. The computer system 400 may implement a mail server stored program component. The mail server may be an Internet mail server such as Microsoft Exchange, or the like. The mail server may utilize facilities such as ASP, ACTIVEX®, ANSI® C++/C#, MICROSOFT®, NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure provides a holistic multi-region of interest 'fitted' boundary generation neural model that is efficient to be executed on the preview frames. The boundaries that are cropped may be non-regular, non-polygonal, fitted to object/regions or set of objects/regions (overlapping or non-overlapping). Therefore, unlike existing techniques which allow boundary cropping which is always polygonal in shape or boundary cropping when a user draws a boundary around the image, the present disclosure uses AI technology to determine various objects in the image, relationship between the objects based on the context and scene description, and then relevance between the objects, and provides boundary suggestions to the user. Therefore, there is no manual interference, and also the method involves implementing the AI based techniques at the preview stage itself. Implementing the method at the preview stage enables amateur or professional photographers to choose/focus multiple most relevant regions at preview stage in the image and provides the option for cropping out one or more parts of the image. As regards video frames during preview stage, multiple boundaries would be generated on video frames as well similarly, out of which the user selects for focusing on one or more objects in the video and cropping thereafter.

The present disclosure also provides the feature of "early exits" that allows the object cropping system to eliminate irrelevant regions, blank spaces and irrelevant frames at the preview stage itself, which reduces the computations on the irrelevant frames.

A description of an embodiment with several components in communication with each other does not imply that all such components are required. On the contrary, a variety of optional components are described to illustrate the wide variety of possible embodiments of the disclosure.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs.

The functionality and/or the features of a device may be alternatively embodied by one or more other devices which are not explicitly described as having such functionality/features. Thus, other embodiments of the disclosure need not include the device itself.

The specification has described methods and system for context-aware crop in a camera preview. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the present disclosure has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

What is claimed is:

1. A method performed by an object cropping system of an electronic device, the method comprising:
   receiving, from a camera, a preview image comprising a plurality of objects;
   determining outline boundaries of the plurality of objects;
   determining a relevance score between the plurality of objects based on context of the plurality of objects and relationship between the plurality of objects;
   generating a plurality of boundary suggestions comprising the plurality of objects, based on the relevance score;
   receiving a user input indicating a selection of one of the plurality of boundary suggestions or a selection of at least one object from the plurality of objects present in the plurality of boundary suggestions, wherein the relevance score is updated for the at least one object based on the user input; and
   cropping the at least one object from the preview image based on the user input and the updated relevance score using the outline boundaries determined for the plurality of objects.

2. The method of claim 1, wherein the outline boundaries of the plurality of objects are determined by using at least one first type Artificial Intelligence (AI) based model.

3. The method of claim 2, wherein the at least one first type AI based model comprises enhanced Region Proposal Network (RPN) for outline boundary determination, and
   wherein the enhanced RPN is integrated with an instance segmentation Deep Neural Network (DNN).

4. The method of claim 1, wherein the plurality of objects have at least one of a polygonal and a non-polygonal shape.

5. The method of claim 3, wherein the relevance score between the plurality of objects based on context of the plurality of objects and relationship between the plurality of objects are determined by using at least one second type AI based model.

6. The method of claim 1, wherein the outline boundaries determined for the plurality of objects are visualized by using borders drawn by a border-line construction model associated with the object cropping system.

7. The method of claim 5, the at least one second type AI based model comprises a Neuro-symbolic model for determining the context of the plurality of objects and the relationship between the plurality of objects.

8. The method of claim 1, wherein the relationship between the plurality of objects is determined based on scene description and the context of the plurality of objects.

9. The method of claim 1, further comprising pre-processing the preview image to eliminate at least one of redundant image frames and irrelevant image frames.

10. The method of claim 1, further comprising storing the cropped at least one object in a single image or in multiple images.

11. The method of claim 2, further comprising, based on the preview image including a single object having one of a polygonal and a non-polygonal shape:
    determining an outline boundary of the single object using the at least one first type AI based model;
    generating at least one boundary suggestion including the single object;
    receiving the user input indicating a selection of one of the at least one boundary suggestion; and
    cropping the single object from the preview image based on the user input using the outline boundary determined for the single object.

12. An electronic device comprising:
    a memory storing instructions; and
    a processor configured to execute the instructions to:
    receive a preview image comprising a plurality of objects;
    determine outline boundaries of the plurality of objects;
    determine a relevance score between the plurality of objects based on context of the plurality of objects and relationship between the plurality of objects;
    generate a plurality of boundary suggestions comprising the plurality of objects, based on the relevance score;
    receive a user input indicating a selection of one of the plurality of boundary suggestions or a selection of at least one object from the plurality of objects present in the plurality of boundary suggestions, wherein the relevance score is updated for the at least one object based on the user input; and
    crop the at least one object from the preview image based on the user input and the updated relevance score using the outline boundaries determined for the plurality of objects.

13. The electronic device of claim 12, wherein the processor is further configured to execute the instructions to determine the outline boundaries of the plurality of objects by using at least one first type Artificial Intelligence (AI) based model.

14. The electronic device of claim 13, wherein the at least one first type AI based model comprises enhanced Region Proposal Network (RPN) for outline boundary determination, wherein the enhanced RPN is integrated with an instance segmentation Deep Neural Network (DNN).

15. The electronic device of claim 12, wherein the plurality of objects have at least one of a polygonal and a non-polygonal shape.

* * * * *